United States Patent
Collins et al.

(10) Patent No.: US 11,997,211 B2
(45) Date of Patent: May 28, 2024

(54) METHOD AND SYSTEM FOR AGGREGATED STORAGE OF OBSERVATIONAL DATA ON A BLOCKCHAIN

(71) Applicant: MASTERCARD INTERNATIONAL INCORPORATED, Purchase, NY (US)

(72) Inventors: Robert Collins, Blackrock (IE); Conor McQuillan, Stillorgan (IE); Susan Lynch, Cavan (IE); Leandro Nunes da Silva Carvalho, Metuchen, NJ (US); Bella Wu, Roslyn, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 310 days.

(21) Appl. No.: 17/487,452

(22) Filed: Sep. 28, 2021

(65) Prior Publication Data
US 2023/0102726 A1    Mar. 30, 2023

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ......... H04L 9/3239; H04L 9/50; G06F 21/64; G06Q 20/3823; G06Q 20/3827; G06Q 20/389; G06Q 90/00
See application file for complete search history.

(56) References Cited

U.S. PATENT DOCUMENTS 10,181,948 B1 * 1/2019 Nenov ................ G06F 9/44505
10,769,135 B1 * 9/2020 Zhuo ................... G06F 16/2379
(Continued)

FOREIGN PATENT DOCUMENTS

GB    2606526 A * 11/2022 ............. G06F 21/64
KR    20230097676 A * 7/2023 ............. G06Q 50/10

OTHER PUBLICATIONS

Pöhls, Henrich C. "JSON sensor signatures (JSS): End-to-end integrity protection from constrained device to IoT application"; 2015 9th International Conference on Innovative Mobile and Internet Services in Ubiquitous Computing; IEEE; Oct. 1, 2015 (Oct. 1, 2015); Retrieved from the Internet: <URL: http://henrich.poehls.com/papers/2015_Poehls-JSONSensorSignatures_esIoT.pdf>, 7 pps.

(Continued)

*Primary Examiner* — Christopher A Revak
(74) *Attorney, Agent, or Firm* — Panitch Schwarze Bellisario & Nadel LLP

(57) ABSTRACT

A method for aggregated storage of observational data on a blockchain includes: receiving, by a receiver of a processing server, a plurality of data entries, wherein the plurality of data entries includes (i) one or more data entries received from each of a plurality of different external devices, or (ii) multiple data entries received from one external device; canonicalize, by a processor of the processing server, the received plurality of data entries into a single data value; hashing, by the processor of the processing server, the single data value to generate a hashed data value; transmitting, by a transmitter of the processing server, the hashed data value to a blockchain node in a blockchain network; receiving, by the receiver of the processing server, a reference value from the blockchain node; and storing, in a memory of the processing server, the received reference value with the plurality of data entries.

14 Claims, 5 Drawing Sheets

(56) References Cited

U.S. PATENT DOCUMENTS

| | | | |
|---|---|---|---|
| 10,826,684 B1 | 11/2020 | Winter et al. | |
| 11,128,463 B1 | 9/2021 | Thompson et al. | |
| 11,139,956 B2* | 10/2021 | Shirley | H04L 9/3255 |
| 11,728,976 B1* | 8/2023 | Godlove | H04L 9/3297 |
| 2019/0258986 A1 | 8/2019 | Nguyen et al. | |
| 2020/0082340 A1 | 3/2020 | Wing et al. | |
| 2020/0160334 A1* | 5/2020 | Alba | H04L 9/0637 |
| 2021/0056501 A1* | 2/2021 | Ravindranathan | G06Q 10/087 |
| 2021/0271667 A1* | 9/2021 | Cohen | H04L 9/3247 |
| 2021/0297253 A1* | 9/2021 | Irazabal | G06F 16/2365 |
| 2023/0274373 A1* | 8/2023 | Dixit | G06Q 50/18 705/311 |

OTHER PUBLICATIONS

Notification of Transmittal of the International Search Report and the Written Opinion of the International Searching Authority, or the Declaration, dated Dec. 6, 2022, in corresponding International Application No. PCT/US2022/041333, 10 pps.

Ali, et al., "A Blockchain-Based Decentralized Data Storage and Access Framework for PingER", 17th IEEE International Conference on Trust, Security and Privacy in Computing and Communications, Aug. 2018, 6 pages.

Demir, et al., "Blockchain and IoT for Delivery Assurance on Supply Chain (BIDAS)", 2019 IEEE International Conference on Big Data, Dec. 2019, 10 pages.

Gruber, et al., "Unifying Lightweight Blockchain Client Implementations", Workshop on Decentralized IoT Security and Standards, Feb. 2018, 7 pages.

Jiang, et al., "A Cross-Chain Solution to Integrating Multiple Blockchains for IoT Data Management", Sensors, vol. 19, No. 9, Article 2042, May 2019, pp. 1-18.

Rejeb, et al., "Leveraging the Internet of Things and Blockchain Technology in Supply Chain Management", Future Internet, vol. 11, No. 7, Article 161, Jul. 2019, pp. 1-22.

\* cited by examiner

METHOD AND SYSTEM FOR AGGREGATED STORAGE OF OBSERVATIONAL DATA ON A BLOCKCHAIN

FIELD

The present disclosure relates to the aggregated storage of data on a blockchain, specifically the use of canonicalization and hashing to store an aggregation of observational data on a blockchain to maintain validity and verifiability without increasing transaction count in the storage of a large amount of data.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

As a result, a vast number of additional uses for blockchains have been discovered. Such uses include for tracking data in voting, recording deed transfers and other documents, keeping chain of custody data, and more. Because a blockchain is an immutable record, a blockchain can be useful in tracking the possession and movement of objects, such as in a supply chain. For example, new entries added to the blockchain each time an item changes hands during distribution of that item enables it to be successfully tracked all the way from manufacturer to sale.

However, the immutability and verifiability of data on a blockchain comes at a cost in terms of both data size and processing time. With every new entry added to a blockchain, the data size of the blockchain increases, which can eventually become restrictive when it comes to onboarding new nodes or retrieving blockchain data for other uses, such as validations. Additionally, the processes of generating and confirming new blocks require considerable computing resources, which often limits the number of new transactions that can be added to a blockchain. As a result, it can be ineffective, if not impossible, to use existing blockchains for cases where the number of new data entries is significantly large, such as over one thousand per second. Thus, there is a need for a technological improvement to the operation of a blockchain to enable the adequate storage of such data in a manner that retains immutability and verifiability despite limitations on processing and maintaining a suitable data size.

SUMMARY

The present disclosure provides a description of systems and methods for aggregated storage of observational data on a blockchain. A processing server, which can be a blockchain node in a blockchain network, receives a plurality of data entries, which can come from a single external device or a plurality of different external devices. For example, a manufacturer of perishable goods can use Internet of Things-enabled devices to capture observational data of the goods during its distribution, such as a pharmaceutical company tracking the temperature and humidity of medication. These devices can report observational data to the processing server at regular intervals where the number of new data entries can be too significant for inclusion as entries in a traditional blockchain. The processing server can canonicalize the data entries into a single data entry that is then hashed to generate a single hash value. This hash value is provided to a blockchain node that adds the hash value into the blockchain in a new blockchain data entry. The blockchain node provides a reference value to that new blockchain data entry back to the processing server. The processing server stores the reference value in a database along with the new data entries that were aggregated. This results in a storage that is tied to the hash value stored on the blockchain, which provides for verifiability of the stored data entries as the hash value can be generated again and verified with the value stored on the blockchain, to prevent tampering of the stored data. Because the blockchain is only used to store the hash values, the number of new blockchain data entries can be kept to a number that is suitable for processing power and data size while allowing for increasing scaling of the data entries received by the processing server to accommodate for any suitable amount of data. The result is a blockchain that still provides immutability and verifiability that can scale with any amount of data that needs to be stored without being constrained by processing power and data size of the blockchain.

A method for aggregated storage of observational data on a blockchain includes: receiving, by a receiver of a processing server, a plurality of data entries, wherein the plurality of data entries includes (i) one or more data entries received from each of a plurality of different external devices, or (ii) multiple data entries received from one external device; canonicalize, by a processor of the processing server, the received plurality of data entries into a single data value; hashing, by the processor of the processing server, the single data value to generate a hashed data value; transmitting, by a transmitter of the processing server, the hashed data value to a blockchain node in a blockchain network; receiving, by the receiver of the processing server, a reference value from the blockchain node; and storing, in a memory of the processing server, the received reference value with the plurality of data entries.

A system for aggregated storage of observational data on a blockchain includes: a plurality of different external devices or one external device; a blockchain node in a blockchain network; and a processing server including a receiver receiving a plurality of data entries, wherein the plurality of data entries includes (i) one or more data entries received from each of the plurality of different external devices, or (ii) multiple data entries received from the one external device, a processor canonicalizing the received plurality of data entries into a single data value, and hashing the single data value to generate a hashed data value, a transmitter transmitting the hashed data value to a blockchain node in a blockchain network, and a memory, wherein the receiver of the processing server receives a reference value from the blockchain node, and the memory of the processing server stores the received reference value with the plurality of data entries.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Aggregated Storage of Observational Data

Figure 1:
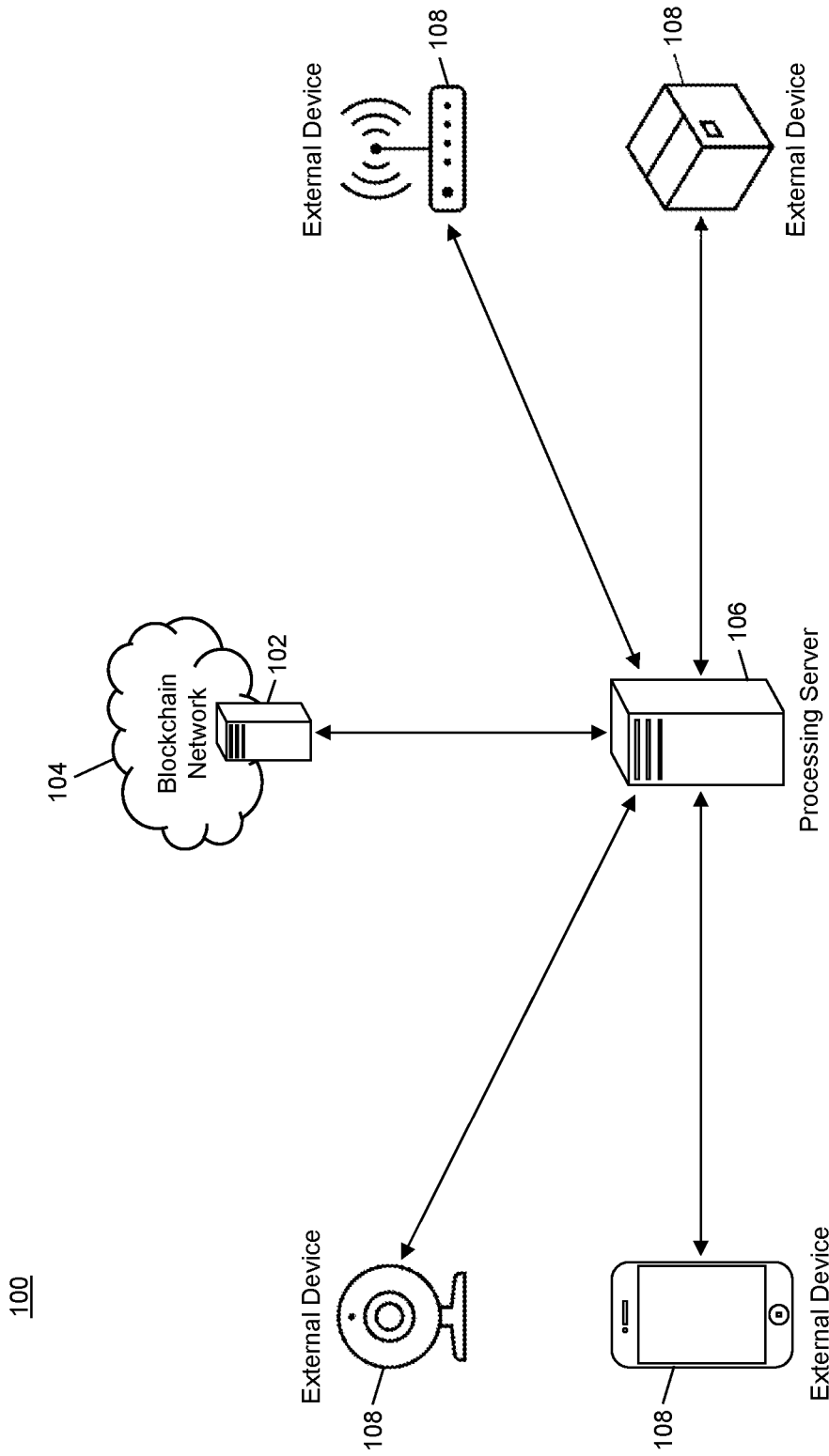
FIG. 1 is a block diagram illustrating a high level system architecture for aggregated storage of observational data on a blockchain in accordance with exemplary embodiments.

FIG. 1 illustrates a system 100 for the aggregated storage of data entries, such as for observational data, through the use of a blockchain.

As discussed herein, the term "blockchain" can refer to a public ledger of all transactions of a blockchain-based currency, also known as a cryptographic currency. One or more computing devices can comprise a blockchain network, discussed in more detail below, which can be configured to process and record transactions as part of a block in the blockchain. Once a block is completed, the block is added to the blockchain and the transaction record thereby updated. In many instances, the blockchain can be a ledger of transactions in chronological order, or can be presented in any other order that can be suitable for use by the blockchain network. In some configurations, transactions recorded in the blockchain can include a destination address and a currency amount, such that the blockchain records how much currency is attributable to a specific address. In some instances, the transactions are financial and others not financial, or might include additional or different information, such as a source address, timestamp, etc. In some embodiments, a blockchain can also or alternatively include nearly any type of data as a form of transaction that is or needs to be placed in a distributed database that maintains a continuously growing list of data records hardened against tampering and revision, even by its operators, and can be confirmed and validated by the blockchain network through proof of work and/or any other suitable verification techniques associated therewith. In some cases, data regarding a given transaction can further include additional data that is not directly part of the transaction appended to transaction data. In some instances, the inclusion of such data in a blockchain can constitute a transaction.

Figure 5:
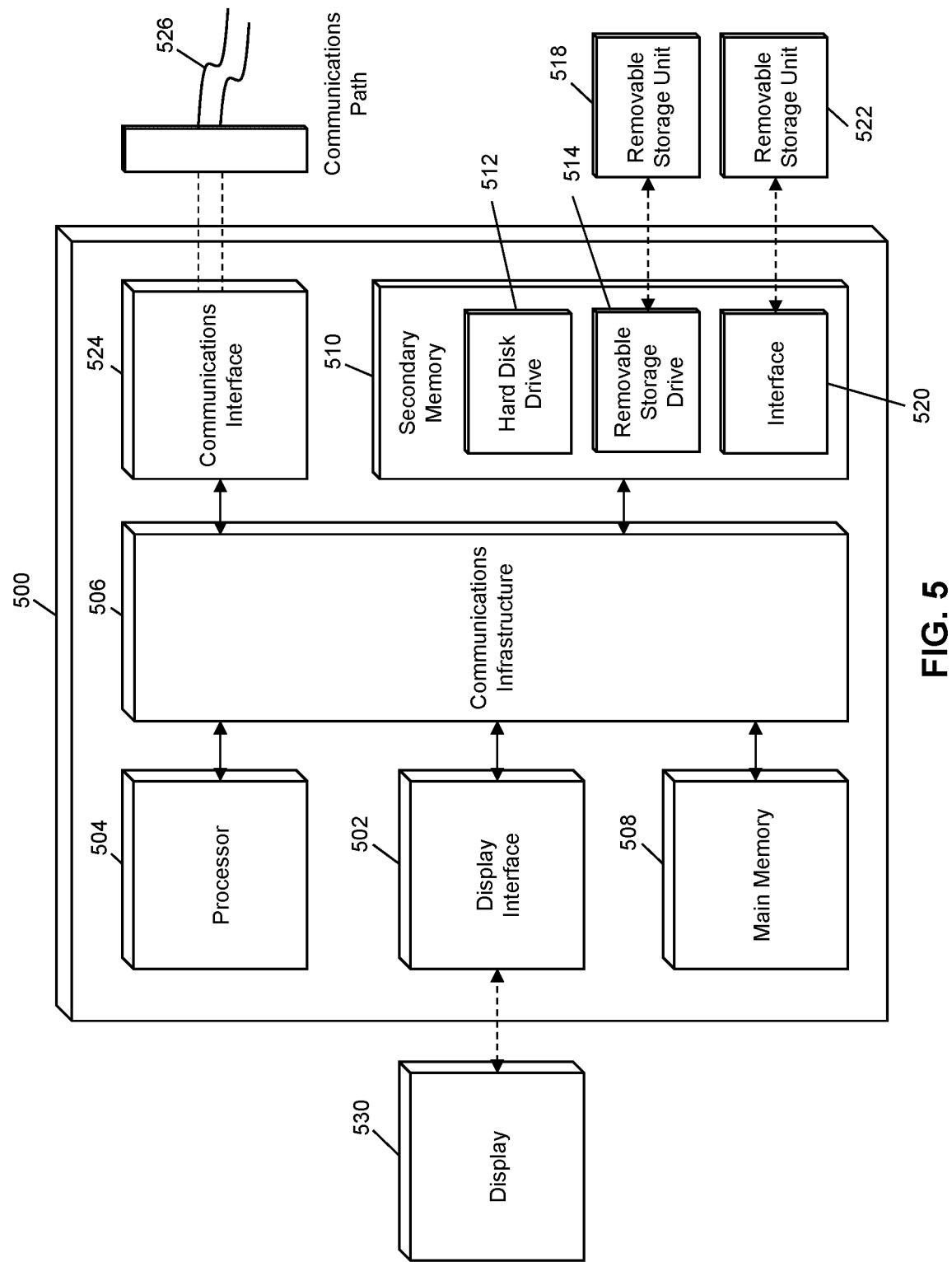
FIG. 5 is a block diagram illustrating a computer system architecture in accordance with exemplary embodiments.

The system 100 can include a blockchain network 104. The blockchain network 104 can be comprised of a plurality of blockchain nodes 102, respectively. Each blockchain node 102 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency that is generated using the sender's private key, a blockchain address of the recipient of currency generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 102 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 104 before being added to the blockchain and distributed to all of the blockchain nodes 102 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be used for the storage of hashes related to aggregated data entries that are stored in another database separate to the blockchain. The system 100 can include a processing server 106. The processing server 106, discussed in more detail below, can be a blockchain node 102 or other type of computing device that is configured to aggregate data entries and provide data values to a blockchain node 102 for inclusion in the associated blockchain as a new blockchain data entry to serve as immutable storage and for verifiability of the data entries.

In the system 100, the processing server 106 can receive a plurality of data entries. The plurality of data entries can be received from one or more external devices 108. Each data entry can include any data for which storage is desired, where there can be no limit on the amount of data, type of data, or format of the data included in the data entry. The external devices 108 can be any type of computing device that is configured to collect data and be capable of electronically transmitting a data entry for the collected data to the processing server 106.

For instance, in one example, the system 100 can be designed to operate as part of a supply chain where the blockchain associated with the blockchain network 104 is used to store data regarding the provenance of goods in the supply chain. In such an example, a manufacturer can manufacture perishable goods that must be kept within certain conditions during distribution. For instance, a pharmaceutical company can manufacture medicine that must be kept within a specific temperature and humidity range in order to remain viable. In this example, the blockchain can be used to record collected data regarding temperature and humidity measurements of the shipping materials or medicine packaging itself. In such an example, the external devices 108 can be Internet of Things-enabled devices or other devices that include sensors to measure temperature and/or humidity. Each external device 108 can collect data readings that can be electronically transmitted to the processing server 106, either directly by the external device 108 or via one or more intermediary computing systems. In such cases, a data entry can include, for example, an identifier associated with the good for which the data is collected (e.g., a serial number, package number, etc.), a timestamp for when the data was collected, and the collected data (e.g., temperature, humidity, geographic location, etc.).

Each data reading can be electronically transmitted to the processing server 106 as one of the plurality of data entries received thereby. In some cases, the processing server 106 can receive each data entry one at a time from external devices 108 (e.g., via intermediate computing systems, as applicable). In other cases, an external device 108 can electronically transmit a group of data entries to the processing server 106, such as at a predetermined interval or period of time. For example, an external device 108 can electronically transmit all recently collected data entries to the processing server 106 every 15 minutes, or can transmit data entries to the processing server 106 once 30 new data entries have been collected. In instances where an external device 108 cannot have a regular communication channel to the processing server 106, such as during shipping, an external device 108 can continue to generate and store data entries during any period of downtime in the connection and can send all waiting data entries to the processing server 106 as soon as a connection is available.

The processing server 106 can receive a plurality of data entries from one or more external devices 108. When desired, the processing server 106 can being a process for the generation of a new blockchain data entry corresponding to received data entries to be stored in the blockchain associated with the blockchain network 104. In some embodiments, the processing server 106 can perform the process at regular intervals, such as every 15 minutes or when a predetermined number of data entries (e.g., 100, 500, 1,000, etc.) have been received for which no new blockchain data entry has been published on the blockchain. In some instances, processing server 106 can aggregate received data entries based on one or more criteria. For instance, the processing server 106 can group data entries by timestamp, package identifier, other identification data, geographic location, etc. In the above example, the processing server 106 can receive temperature measurements from one external device 108 for five different packages during a thirty minute period and can receive humidity measurements from another external device 108 for the same five packages during the same thirty minute period. In this example, the processing server 106 can group the data entries by package identifier, such that the processing server 106 can have five different groups of data entries for inclusion in new blockchain data entries.

When the processing server 106 is ready to have a new blockchain data entry created, the processing server 106 can identify the group of data entries that are to be aggregated and can canonicalize the data entries. Canonicalization of the data entries can result in the generation of a single data value for the group of data entries. In one example, a serialization process can be used to serialize the group of data entries to result in a single data value. The processing server 106 can then apply a hashing algorithm to the single data value to generate a hash value. In an exemplary embodiment, the hashing algorithm can be a collision-resistant one-way hashing algorithm such that the single data value used in the generation of the hash value cannot be reverse engineered from the hash value, such as the SHA-256 algorithm.

The processing server 106 can then electronically transmit the generated hash value to a blockchain node 102 in the blockchain network 104 for inclusion in a new block. The blockchain node 102 can receive the hash value and include the hash value in a new block that is generated for the blockchain. As part of the generation of the new block, a reference identifier can be generated that is directly associated with a blockchain data entry that includes the hash value and unique to that blockchain data entry or is directly associated with the block and unique to that block. Once the new block has been transmitted to other blockchain nodes 102 in the blockchain network 104 and confirmed using traditional processes, the hash value can be published on the blockchain as the blockchain data entry in the new block. The blockchain node 102 can electronically transmit the reference identifier back to the processing server 106 using a suitable communication network and method.

The processing server 106 can receive the reference identifier from the blockchain node 102. The processing server 106 can associate the received reference identifier with the group of data entries for which the new blockchain data entry was generated and published to the blockchain. The processing server 106 can store the group of data entries with its reference identifier in a database, which can be a local database that is part of the processing server 106 or directly accessible thereby, or can be external to the processing server 106 and accessible via a communication network, such as via cloud storage. The stored data entries with the corresponding reference identifier can then be used by the processing server 106 in verifying the data included therein through use of the hash value stored in the associated blockchain data entry.

In the above example, the pharmaceutical company that manufactures the medicine can be provided with temperature and humidity measurements of one of the packages of the medicine by a pharmacy that has received the package from a distributor. The pharmacy can provide the pharmaceutical company with its measured humidity and temperature readings, which the pharmaceutical company can be interested in checking against the last readings available from the package during shipping. The pharmaceutical company can electronically transmit the package identifier and an approximate timestamp to the processing server 106 using a suitable communication network and method.

The processing server 106 can receive the package identifier and timestamp and can query its database to identify the data entries that include the package identifier and identify any data entries for which the timestamp is the same as the provided timestamp or within a predetermined range (e.g., within 15 minutes or the closest before and after the timestamp on both sides). The processing server 106 can then electronically transmit the identified data entries to the pharmaceutical company, which it can then compare with the data received from the pharmacy. In some cases, the processing server 106 or pharmaceutical company can be interested in having the data entries verified. In such cases, the processing server 106 or another computing system (e.g., of the pharmaceutical company) can identify every data entry in a group that includes the data entries identified for the pharmaceutical company such as by identifying all other data entries that include the same reference identifier. The processing server 106 (e.g., or other computing system, as applicable) can canonicalize the data into a single data value and then hash that single value to generate a hash value. The processing server 106 can then identify a blockchain data entry in the blockchain that includes the reference identifier, or identify all blockchain data entries in a block that includes the reference identifier, and identify the hash value(s) stored therein. The processing server 106 can then compare the hash value(s) from the blockchain with the generated hash value. If the values are the same, than the data entries in the group can be considered accurate and verified as not being tampered with, as any change to any of the data entries would result in a generated hash value that does not match the hash value stored in the blockchain. The processing server 106 can provide a result of the verification to the pharmaceutical company, which can then be assured that the received data entries are accurate and utilize the data stored therein accordingly.

In some alternative embodiments, the processing server 106 can use a probabilistic data structure for groups of data entries instead of performing a canonicalization process. In such embodiments, the processing server 106 can hash each of the data entries in a group and then place the hashes into the probabilistic data structure, such as a cuckoo filter or a bloom filter. The filter can be provided by the processing server 106 to the blockchain node 102 for storage in a new blockchain data entry. In such an embodiment, each individual data entry can be verifiable on its own (e.g., instead of a group of data entries as discussed above) by hashing the data entry and checking its inclusion in the probabilistic data structure. In some embodiments, a combination of the canonicalization and probabilistic data structure can be used, where a blockchain data entry can include the above hash value as well as the probabilistic data structure, which can enable verification of individual data entries via the probabilistic data structure and verification of the group of data entries as a whole to account for false positives made through use of probabilistic data structures.

The methods and systems discussed herein enable for large amounts of data to have verifiability and validity through use of a blockchain, but without increasing processing times or data sizes of the blockchain. By aggregating data entries and using a single resulting value for storage in the blockchain, the data entries can still be verified using immutable data in the blockchain without increasing the number of data entries added to the blockchain beyond an undesirable amount with respect to processing speed and data size. This can enable cases such as the above example, where thousands or millions of measurements can be collected in short periods of time and allow for scaling to any needed amount. Thus, the methods and systems discussed herein provide a technological improvement over existing blockchains.

Processing Server

Figure 2:
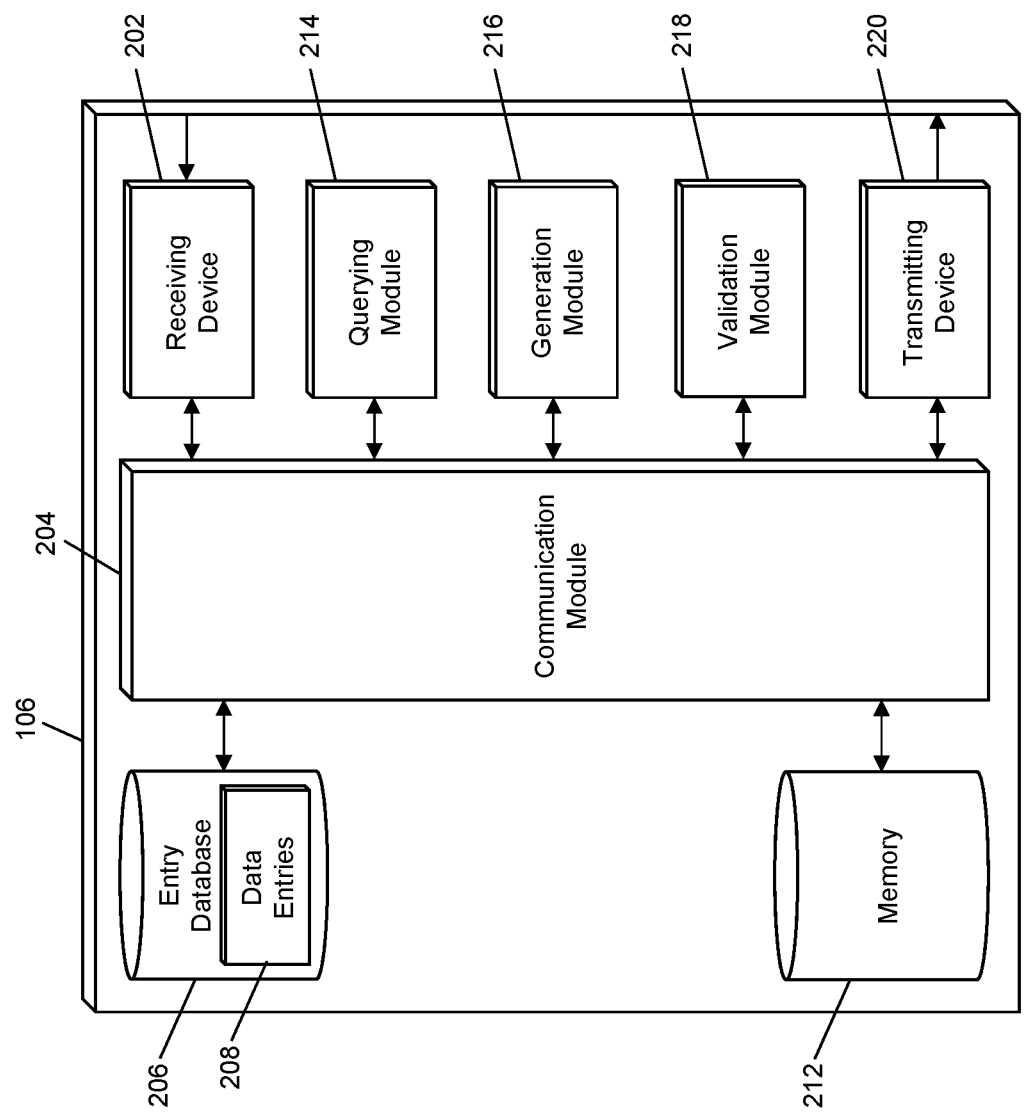
FIG. 2 is a block diagram illustrating the processing server of the system of FIG. 1 for aggregated storage of observational data on a blockchain in accordance with exemplary embodiments.

FIG. 2 illustrates an embodiment of the processing server 106 in the system 100. The embodiment of the processing server 106 illustrated in FIG. 2 is provided as illustration only and cannot be exhaustive to all possible configurations of the processing server 106 suitable for performing the functions as discussed herein. For example, the computer system 500 illustrated in FIG. 5 and discussed in more detail below can be a suitable configuration of the processing server 106.

The processing server 106 can include a receiving device 202. The receiving device 202 can be configured to receive data over one or more networks via one or more network protocols. In some instances, the receiving device 202 can be configured to receive data from blockchain nodes 102, external devices 108, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 102, which can be superimposed or otherwise encoded with new blocks, blockchain data entries, reference identifiers, etc. The receiving device 202 can be configured to receive data signals electronically transmitted by external devices 108, and can be transmitted through one or more intermediary computing systems, that can be superimposed or otherwise encoded with data entries, such as can include observational data. The receiving device 202 can also be configured to receive data signals electronically transmitted by additional computing systems that can be superimposed or otherwise encoded with requests for data entries, requests for verification of data entries, etc.

The processing server 106 can also include a communication module 204. The communication module 204 can be configured to transmit data between modules, engines, databases, memories, and other components of the processing server 106 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 106 and external components of the processing server 106, such as externally connected databases, display devices, input devices, etc. The processing server 106 can also include a processing device. The processing device can be configured to perform the functions of the processing server 106 discussed herein. In some embodiments, the processing device can include and/or be comprised of a plurality of engines and/or modules specially configured to perform one or more functions of the processing device, such as a querying module 214, generation module 216, validation module 218, etc. As used herein, the term "module" can be software or hardware particularly programmed to receive an input, perform one or more processes using the input, and provides an output. The input, output, and processes performed by various modules will be apparent based on the disclosure herein.

The processing server 106 can include an entry database 206. The entry database 206 can be configured to store a plurality of data entries 208 using a suitable data storage format and schema. The entry database 206 can be a relational database that utilizes structured query language for the storage, identification, modifying, updating, accessing, etc. of structured data sets stored therein. Each data entry 208 can be a structured data set configured to store data related to data entries received from external devices 108. Each data entry 208 can include a reference identifier corresponding to a blockchain data entry or block in the blockchain associated with the blockchain network 104. A data entry 208 can include any data that can be dependent on the application. For instance, in the above example, a data entry 208 can include a reference identifier, package identifier, timestamp, and at least one of: humidity, temperature, and geographic location.

The processing server 106 can also include a memory 212. The memory 212 can be configured to store data for use by the processing server 106 in performing the functions discussed herein, such as public and private keys, symmetric keys, etc. The memory 212 can be configured to store data using suitable data formatting methods and schema and can be any suitable type of memory, such as read-only memory, random access memory, etc. The memory 212 can include, for example, encryption keys and algorithms, communication protocols and standards, data formatting standards and protocols, program code for modules and application programs of the processing device, and other data that can be suitable for use by the processing server 106 in the performance of the functions disclosed herein as will be apparent. In some embodiments, the memory 212 can be comprised of or can otherwise include a relational database that utilizes structured query language for the storage, identification, modifying, updating, accessing, etc. of structured data sets stored therein. The memory 212 can be configured to store, for example, cryptographic keys, salts, nonces, communication information for blockchain nodes 102 and blockchain networks 104, hashing algorithms, serialization rules and algorithms, etc.

The processing server 106 can include a querying module 214. The querying module 214 can be configured to execute queries on databases to identify information. The querying module 214 can receive one or more data values or query strings, and can execute a query string based thereon on an indicated database, such as the memory 212 of the processing server 106 to identify information stored therein. The querying module 214 can then output the identified information to an appropriate engine or module of the processing server 106 as necessary. The querying module 214 can, for example, execute a query on the entry database 206 to identify a data entry 208 that includes a package identifier or other value as requested for use in identifying a reference identifier included therein.

The processing server 106 can also include a generation module 216. The generation module 216 can be configured to generate data for use by the processing server 106 in performing the functions discussed herein. The generation module 216 can receive instructions as input, can generate data based on the instructions, and can output the generated data to one or more modules of the processing server 106. For example, the generation module 216 can be configured to generate groups of data entries based on common data values included therein, or to generate single data values from a group of data entries using canonicalization, such as through a serialization process. The generation module 216 can also be configured to generate hash values from data values via application of a hashing algorithm thereto.

The processing server 106 can also include a validation module 218. The validation module 218 can be configured to perform validations for the processing server 106 as part of the functions discussed herein. The validation module 218 can receive instructions as input, which can also include data to be used in performing a validation, can perform a validation as requested, and can output a result of the validation to another module or engine of the processing server 106. The validation module 218 can, for example, be configured to validate hash values by comparing two hash values together, such as a generated hash value being compared to a hash value identified in a blockchain data entry, as discussed above.

The processing server 106 can also include a transmitting device 220. The transmitting device 220 can be configured to transmit data over one or more networks via one or more network protocols. In some instances, the transmitting device 220 can be configured to transmit data to blockchain nodes 102, external devices 108, and other entities via one or more communication methods, local area networks, wireless area networks, cellular communication, Bluetooth, radio frequency, the Internet, etc. In some embodiments, the transmitting device 220 can be comprised of multiple devices, such as different transmitting devices for transmitting data over different networks, such as a first transmitting device for transmitting data over a local area network and a second transmitting device for transmitting data via the Internet. The transmitting device 220 can electronically transmit data signals that have data superimposed that can be parsed by a receiving computing device. In some instances, the transmitting device 220 can include one or more modules for superimposing, encoding, or otherwise formatting data into data signals suitable for transmission.

The transmitting device 220 can be configured to electronically transmit data signals to blockchain nodes 102, which can be superimposed or otherwise encoded with requests for blockchain data entries, new hash values, new blockchain data entries, etc. The transmitting device 220 can also be configured to electronically transmit data signals to external devices 108 that can be superimposed or otherwise encoded with requests for data entries, requests for data values for one or more data entries, etc. The transmitting device 220 can also be configured to electronically transmit data signals to other computing systems, such as can be superimposed or otherwise encoded with data entries, verification results, etc.

Process for Verifying a Data Entry

Figure 3:
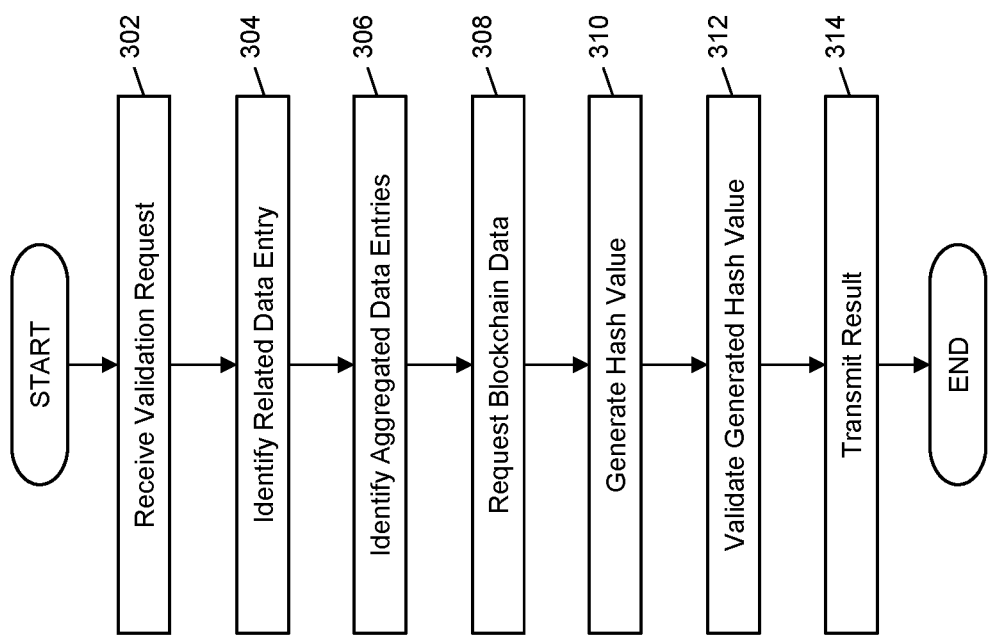
FIG. 3 is a flow diagram illustrating a process for verifying a data entry in through use of aggregated storage and a blockchain in accordance with exemplary embodiments.

FIG. 3 illustrates a process 300 for verifying a data entry by the processing server 106 based on stored data entries 208 and verification using a blockchain associated with the blockchain network 104 in the system 100.

In step 302, the receiving device 202 of the processing server 106 can receive a request for validation of a data entry from a computing system, such as from a pharmaceutical company in the above example. The request for validation can include a data entry for which verification is requested or can include an identification value and one or more other data values corresponding to a data entry 208 for which verification is requested. In step 304, the querying module 214 of the processing server 106 can execute a query on the entry database 206 to identify a data entry 208 related to the received request for validation, such as by using the received identification value and other data value(s) or a received data entry. In step 306, the querying module 214 of the processing server 106 can execute another query on the entry database 206 to identify all other data entries 208 in a group with the first identified data entry 208, which can be an aggregated set of all other data entries 208 that include the same reference identifier included in the first identified data entry 208.

In step 308, the processing server 106 can request (e.g., via a submission by the transmitting device 220 of the processing server 106) a blockchain data entry from a blockchain node 102 in the blockchain network 104 using the reference identifier included in each of the data entries 208 in the identified group. In cases where the processing server 106 can be a blockchain node 102 or have direct access to the blockchain, the processing server 106 itself can identify the blockchain data entry that includes the reference identifier. In cases where a reference identifier is unique to an entire block, the processing server 106 can identify all of the blockchain data entries included in the associated block.

In step 310, the generation module 216 of the processing server 106 can canonicalize the group of data entries into a single data value and apply a hashing algorithm to the single data value to generate a hash value. In step 312, the validation module 218 of the processing server 106 can validate the group of data entries by checking the generated hash value with a hash value included in the identified blockchain data entry (e.g., or each hash value included in all of the blockchain data entries identified for a specific block, as applicable). In step 314, the transmitting device 220 of the processing server 106 can electronically transmit the result of the validation in response to the request received in step 302.

Exemplary Method for Aggregated Storage of Data

Figure 4:
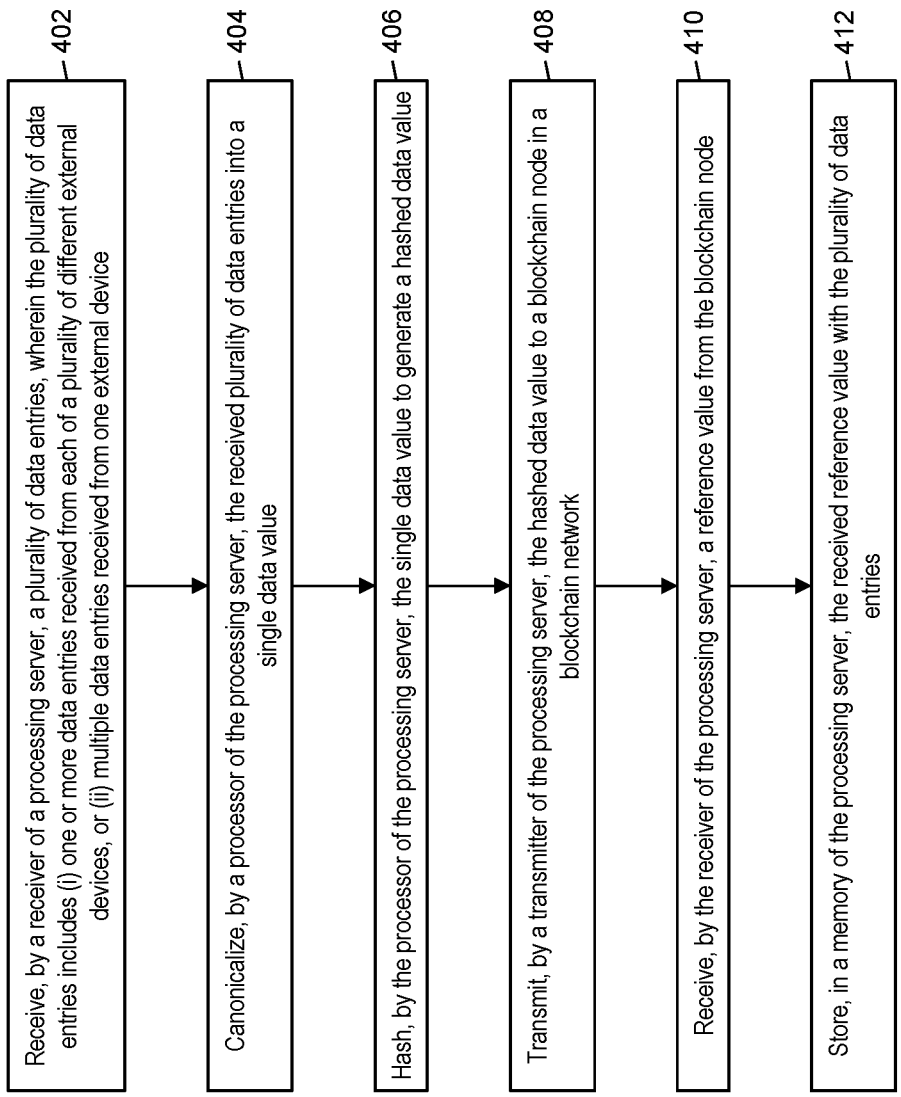
FIG. 4 is a flow chart illustrating an exemplary method for aggregated storage of observational data on a blockchain in accordance with exemplary embodiments.

FIG. 4 illustrates a method 400 for the aggregated storage of observational data in a verifiable and immutable form via the use of canonicalization and a blockchain.

In step 402, a plurality of data entries can be received by a receiver (e.g., receiving device 202) of a processing server (e.g., processing server 106), wherein the plurality of data entries includes (i) one or more data entries received from each of a plurality of different external devices (e.g., external devices 108), or (ii) multiple data entries received from one external device. In step 404, the received plurality of data entries can be canonicalized by a processor (e.g., generation module 216) of the processing server into a single data value. In step 406, the single data value can be hashed by the processor (e.g., generation module 216) of the processing server to generate a hashed data value.

In step 408, the hashed data value can be transmitted by a transmitter (e.g., transmitting device 220) of the processing server to a blockchain node (e.g., blockchain node 102) in a blockchain network (e.g., blockchain network 104). In step 410, a reference value can be received by the receiver of the processing server from the blockchain node. In step 412, the received reference value can be stored in a memory (e.g., entry database 206, memory 212, etc.) of the processing server with the plurality of data entries.

In one embodiment, each external device can be an Internet of Things device. In some embodiments, each of the plurality of data entries can be an observational reading from the respective external device. In a further embodiment, each observational reading can be obtained by the respective external device within a predetermined period of time. In another further embodiment, the observational reading can include at least one of: time, temperature, humidity, geographic location, and reference value.

In one embodiment, canonicalizing the received plurality of data entries into a single data value can utilize a serialization process. In some embodiments, the method 400 can further include: receiving, by the receiver of the processing server, a blockchain data entry, the blockchain data entry including a hash value and the reference value; executing, by the processor (e.g., querying module 214) of the processing server, a query on the memory to identify the plurality of data entries stored with the reference value; generating, by the processor (e.g., generation module 216) of the processing server, a test value by canonicalizing and hashing the identified plurality of data entries; and validating, by the processor (e.g., validation module 218) of the processing server, that the hash value matches the generated test value.

Computer System Architecture

FIG. 5 illustrates a computer system 500 in which embodiments of the present disclosure, or portions thereof, can be implemented as computer-readable code. For example, the processing server 106 of FIGS. 1 and 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). Embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations may be suitable in accordance with the discussion herein. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as suitable based on the discussion herein. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. Such processes can result in the computer system 500 being a specially configured computer system 500 uniquely programmed to perform the functions discussed above.

Techniques consistent with the present disclosure provide, among other features, systems and methods for aggregated storage of observational data on a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for aggregated storage of observational data on a blockchain, comprising:
   receiving, by a receiver of a processing server, a plurality of data entries, wherein the plurality of data entries includes (i) one or more data entries received from each of a plurality of different external devices, or (ii) multiple data entries received from one external device;
   convert, by a processor of the processing server, the received plurality of data entries into a single data value;
   hashing, by the processor of the processing server, the single data value to generate a hashed data value;
   transmitting, by a transmitter of the processing server, the hashed data value to a blockchain node in a blockchain network;
   receiving, by the receiver of the processing server, a reference value from the blockchain node, the reference value being for a blockchain data entry of the hashed data value; and
   storing, in a memory of the processing server, the received reference value with the plurality of data entries.

2. The method of claim 1, wherein each external device is an Internet of Things device.

3. The method of claim 1, wherein each of the plurality of data entries is an observational reading from the respective external device.

4. The method of claim 3, wherein each observational reading is obtained by the respective external device within a predetermined period of time.

5. The method of claim 3, wherein the observational reading includes at least one of: time, temperature, humidity, geographic location, and reference value.

6. The method of claim 1, wherein converting the received plurality of data entries into a single data value utilizes a serialization process.

7. The method of claim 1, further comprising:
   receiving, by the receiver of the processing server, the blockchain data entry, the blockchain data entry including a hash value and the reference value;
   executing, by the processor of the processing server, a query on the memory to identify the plurality of data entries stored with the reference value;
   generating, by the processor of the processing server, a test value by converting and hashing the identified plurality of data entries; and
   validating, by the processor of the processing server, that the hash value matches the generated test value.

8. A system for aggregated storage of observational data on a blockchain, comprising:
   a plurality of different external devices or one external device;
   a blockchain node in a blockchain network; and
   a processing server including
      a receiver receiving a plurality of data entries, wherein the plurality of data entries includes (i) one or more data entries received from each of the plurality of different external devices, or (ii) multiple data entries received from the one external device,
      a processor converting canonicalizing the received plurality of data entries into a single data value, and hashing the single data value to generate a hashed data value,
      a transmitter transmitting the hashed data value to a blockchain node in a blockchain network, and
      a memory, wherein
   the receiver of the processing server receives a reference value from the blockchain node, the reference value being for a blockchain data entry of the hashed data value and
   the memory of the processing server stores the received reference value with the plurality of data entries.

9. The system of claim 8, wherein each external device is an Internet of Things device.

10. The system of claim 8, wherein each of the plurality of data entries is an observational reading from the respective external device.

11. The system of claim 10, wherein each observational reading is obtained by the respective external device within a predetermined period of time.

12. The system of claim 10, wherein the observational reading includes at least one of: time, temperature, humidity, geographic location, and reference value.

13. The system of claim 8, wherein converting the received plurality of data entries into a single data value utilizes a serialization process.

14. The system of claim 8, wherein
  the receiver of the processing server receives the blockchain data entry, the blockchain data entry including a hash value and the reference value, and
  the processor of the processing server
    executes a query on the memory to identify the plurality of data entries stored with the reference value,
    generates a test value by converting and hashing the identified plurality of data entries, and
  validates that the hash value matches the generated test value.

* * * * *